(12) United States Patent
Kong

(10) Patent No.: US 12,549,854 B2
(45) Date of Patent: Feb. 10, 2026

(54) METHOD AND APPARATUS FOR PICTURE STABILITY PROCESSING UNDER DIGITAL ZOOM, MOBILE TERMINAL, AND MEDIUM

(71) Applicant: Huizhou TCL Cloud Internet Corporation Technology Co., Ltd., Guangdong (CN)

(72) Inventor: Deshang Kong, Guangdong (CN)

(73) Assignee: Huizhou TCL Cloud Internet Corporation Tech, Guangdong (CN)

( * ) Notice: Subject to any disclaimer, the term of this patent is extended or adjusted under 35 U.S.C. 154(b) by 120 days.

(21) Appl. No.: 18/681,897

(22) PCT Filed: Jul. 20, 2022

(86) PCT No.: PCT/CN2022/106862
§ 371 (c)(1),
(2) Date: Feb. 7, 2024

(87) PCT Pub. No.: WO2023/016220
PCT Pub. Date: Feb. 16, 2023

(65) Prior Publication Data
US 2024/0340535 A1    Oct. 10, 2024

(30) Foreign Application Priority Data

Aug. 12, 2021   (CN) .......................... 202110925944.X

(51) Int. Cl.
*H04N 23/68* (2023.01)
*H04N 23/63* (2023.01)

(52) U.S. Cl.
CPC ....... *H04N 23/683* (2023.01); *H04N 23/6812* (2023.01); *H04N 23/633* (2023.01)

(58) Field of Classification Search
None
See application file for complete search history.

(56) References Cited

U.S. PATENT DOCUMENTS

| 11,470,254 | B1* | 10/2022 | Karpushin | .............. G06T 7/246 |
| 2013/0169833 | A1 | 7/2013 | Omori | |
| 2020/0267320 | A1* | 8/2020 | Song | ...................... H04N 23/45 |

FOREIGN PATENT DOCUMENTS

| CN | 110213490 A | 9/2019 |
| CN | 112291476 A | 1/2021 |
| CN | 112422805 A | 2/2021 |

(Continued)

OTHER PUBLICATIONS

International Search Report in International application No. PCT/CN2022/106862, mailed on Sep. 29, 2022.

(Continued)

*Primary Examiner* — Cynthia Segura
(74) *Attorney, Agent, or Firm* — PV IP PC; Wei Te Chung

(57) ABSTRACT

An image stabilization method under digital zoom and a mobile terminal. The method includes: obtaining a captured image; detecting a current shaking condition to obtain a shaking intensity; determining a field of view required to maintain image stability according to the shaking intensity; dynamically cropping the captured image according to the field of view to obtain an input image of an anti-shake algorithm; processing the input image of the anti-shake algorithm through the anti-shake algorithm to obtain a stable output image.

15 Claims, 5 Drawing Sheets

```
┌─────────────────────────────────────────────────────────┐
│ obtaining a fixed field of view and a floating cropping │
│ frame of a shaking frame that are required to maintain  │─ S301
│ image stability according to the shaking intensity      │
└─────────────────────────────────────────────────────────┘
                          │
                          ▼
┌─────────────────────────────────────────────────────────┐
│ determining the fixed field of view according to a      │
│ field of view corresponding to a current image          │─ S302
│ displayed on a screen                                   │
└─────────────────────────────────────────────────────────┘
                          │
                          ▼
┌─────────────────────────────────────────────────────────┐
│ determining the floating cropping frame                 │─ S303
│ according to the shaking amplitude                      │
└─────────────────────────────────────────────────────────┘
```

(56) References Cited

FOREIGN PATENT DOCUMENTS

| CN | 113824876 A | 12/2021 |
|---|---|---|
| JP | 07294975 A | 11/1995 |
| JP | H10339893 A | 12/1998 |

OTHER PUBLICATIONS

Written Opinion of the International Search Authority in International application No. PCT/CN2022/106862, mailed on Sep. 29, 2022.
Chinese Office Action issued in corresponding Chinese Patent Application No. 202110925944.X dated Nov. 3, 2022, pp. 1-5.
European Search Report in European application No. 22855203.0, mailed on Jun. 17, 2025.

\* cited by examiner

METHOD AND APPARATUS FOR PICTURE STABILITY PROCESSING UNDER DIGITAL ZOOM, MOBILE TERMINAL, AND MEDIUM

This application is a US national phase application based upon an International Application No. PCT/CN2022/106862, filed on Jul. 20, 2022, which claims the priority of Chinese Patent Application No. 202110925944.X, entitled "METHOD AND APPARATUS FOR PICTURE STABILITY PROCESSING UNDER DIGITAL ZOOM, MOBILE TERMINAL, AND MEDIUM", filed on Aug. 12, 2021, the disclosure of which is incorporated herein by reference in its entirety.

FIELD OF INVENTION

The present disclosure relates to a technical field of a mobile terminal, in particular to an image stabilization method under digital zoom and a mobile terminal.

BACKGROUND

With development of science and technology and continuous improvement of people's living standards, various mobile terminals such as mobile phones have become more and more popular, and mobile phones have become an indispensable communication tool in people's lives.

Mobile terminals have more and more functions. For example, taking pictures through a camera is one of the most commonly used functions. However, stability of videos or preview images under digital zoom on current mobile terminals is not very good, causing inconvenience to users.

Therefore, current technology still needs to be improved and enhanced.

SUMMARY

Technical Problem

It is necessary to solve a technical problem of how to effectively improve stability of videos or preview images under digital zoom to provide convenience for users.

Solution to Technical Problem

Technical Solution

In a first aspect, an embodiment of the present disclosure provides an image stabilization method under digital zoom, which comprises:
  obtaining a captured image;
  detecting a current shaking condition to obtain a shaking intensity;
  determining a field of view required to maintain image stability according to the shaking intensity;
  dynamically cropping the captured image according to the field of view to obtain an input image of an anti-shake algorithm;
  processing the input image of the anti-shake algorithm through the anti-shake algorithm to obtain a stable output image.

In a second aspect, another embodiment of the present disclosure provides An image stabilization device under digital zoom, comprising:
  an image acquisition module, configured to obtain a captured image;
  a shaking intensity acquisition module, configured to detect a current shaking condition to obtain a shaking intensity;
  a field of view determination module, configured to determine a field of view required to maintain image stability according to the shaking intensity;
  a dynamic cropping module, configured to dynamically crop the captured image according to the field of view to obtain an input image of an anti-shake algorithm;
  an anti-shake processing and output module, configured to process the input image of the anti-shake algorithm through the anti-shake algorithm to obtain a stable output image.

In a third aspect, still another embodiment of the present disclosure provides a mobile terminal, which comprises a memory, a processor, and an image stabilization program under digital zoom stored in the memory and executed by the processor to perform the image stabilization method under digital zoom. The image stabilization method comprises:
  obtaining a captured image;
  detecting a current shaking condition to obtain a shaking intensity;
  determining a field of view required to maintain image stability according to the shaking intensity;
  dynamically cropping the captured image according to the field of view to obtain an input image of an anti-shake algorithm;
  processing the input image of the anti-shake algorithm through the anti-shake algorithm to obtain a stable output image.

In a fourth aspect, yet another embodiment of the present disclosure provides a computer readable storage medium which stores image stabilization program instructions executable by a processor to perform the image stabilization method under digital zoom. The image stabilization method comprising:
  obtaining a captured image;
  detecting a current shaking condition to obtain a shaking intensity;
  determining a field of view required to maintain image stability according to the shaking intensity;
  dynamically cropping the captured image according to the field of view to obtain an input image of an anti-shake algorithm;
  processing the input image of the anti-shake algorithm through the anti-shake algorithm to obtain a stable output image.

BENEFICIAL EFFECT OF INVENTION

Advantageous Effect

Compared with prior art, the present disclosure provides an image stabilization method under digital zoom. The image stabilization method under digital zoom includes: obtaining a captured image; detecting a current shaking condition to obtain a shaking intensity; determining a field of view required to maintain image stability according to the shaking intensity; dynamically cropping the captured image according to the field of view to obtain an input image of an anti-shake algorithm; processing the input image of the anti-shake algorithm through the anti-shake algorithm to obtain a stable output image. The present disclosure detects a shaking condition of the camera under digital zoom in real time to adjust the field of view in real time. A part of the captured image in the field of view comprises a fixed field of view and a shaking frame. A size of the shaking frame is adjusted in real time according to the shaking condition, so that the output image under digital zoom is clear and stable, thereby improving user experience in mobile photography.

BRIEF DESCRIPTION OF DRAWINGS

Description of Drawings

Figure 1:
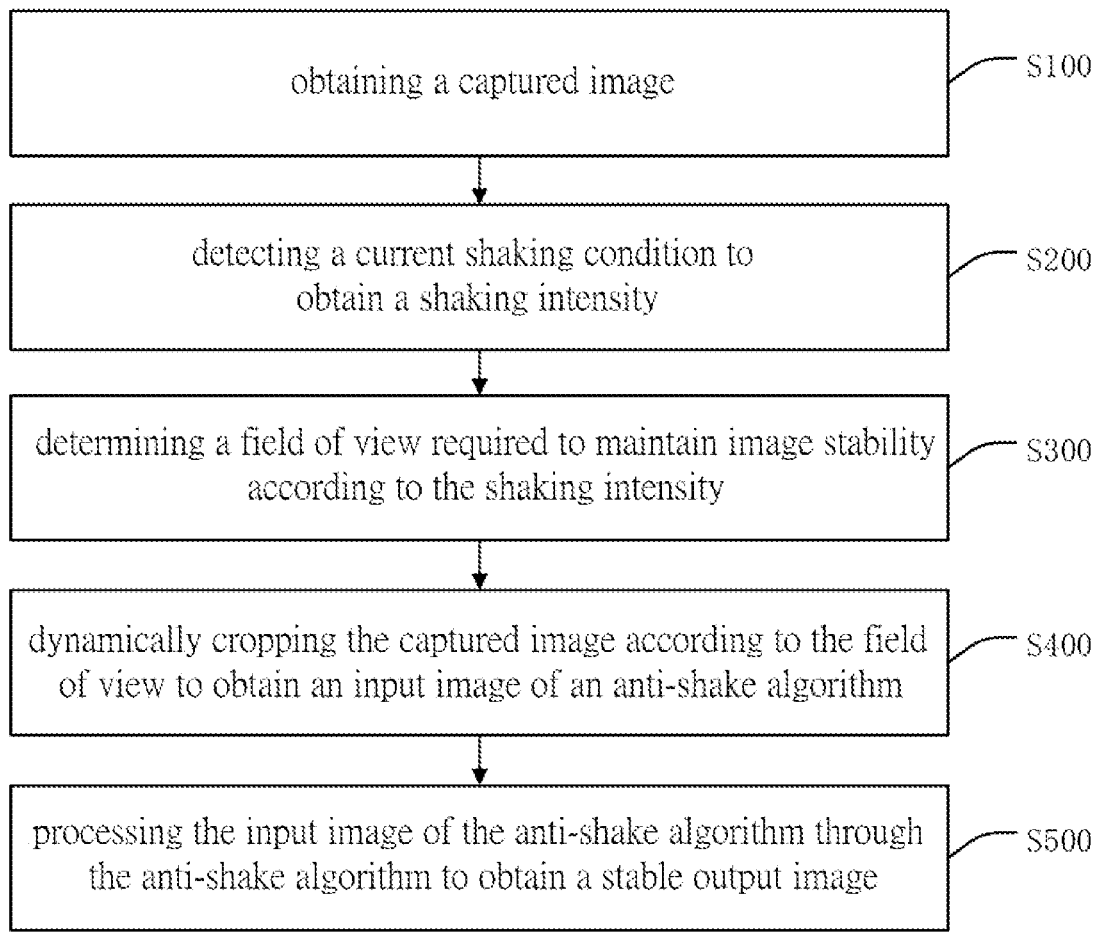

FIG. 1 is a flowchart of an image stabilization method under digital zoom according to an embodiment of the present disclosure.

Figure 2:
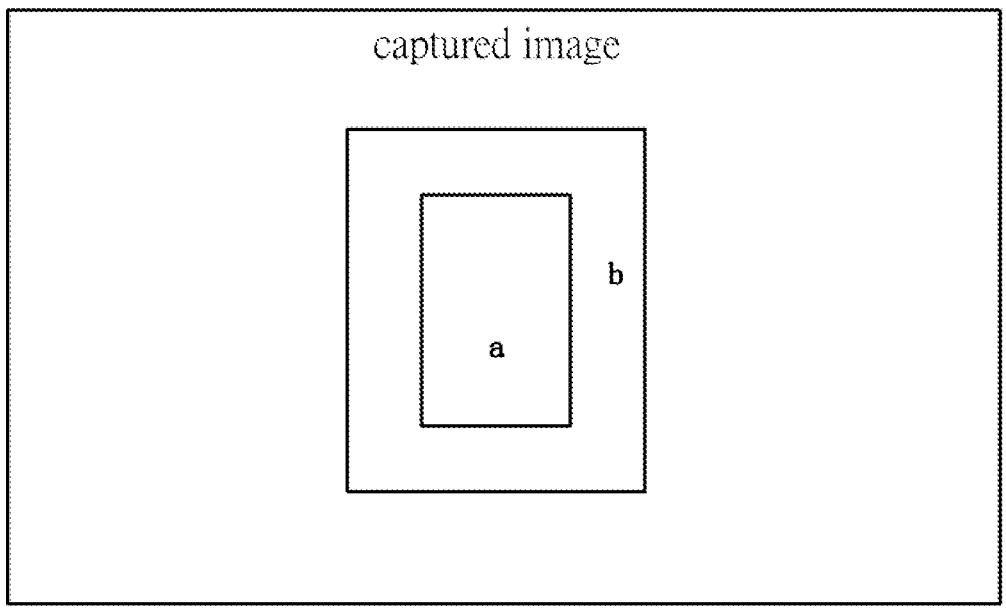

FIG. 2 is a schematic diagram of dividing a photographed image into a fixed field of view a and a floating cropping frame b according to a shaking amplitude and frequency in an embodiment of the present disclosure.

Figure 3:
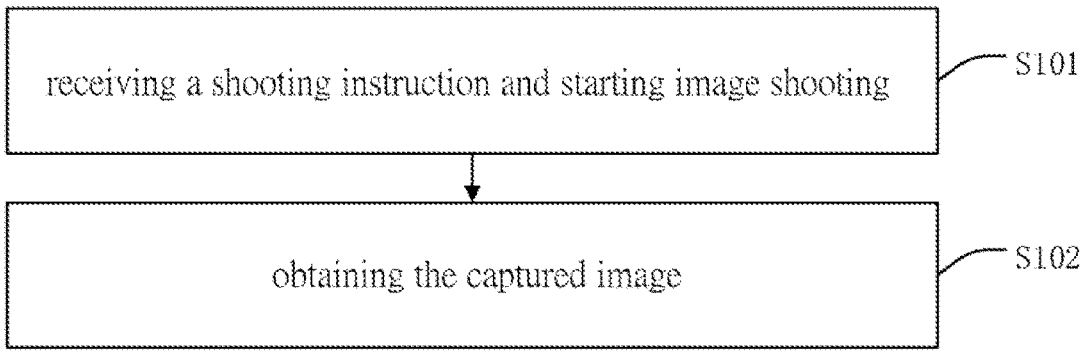

FIG. 3 is a schematic flowchart of step S100 in FIG. 1 according to an embodiment of the present disclosure.

Figure 4:
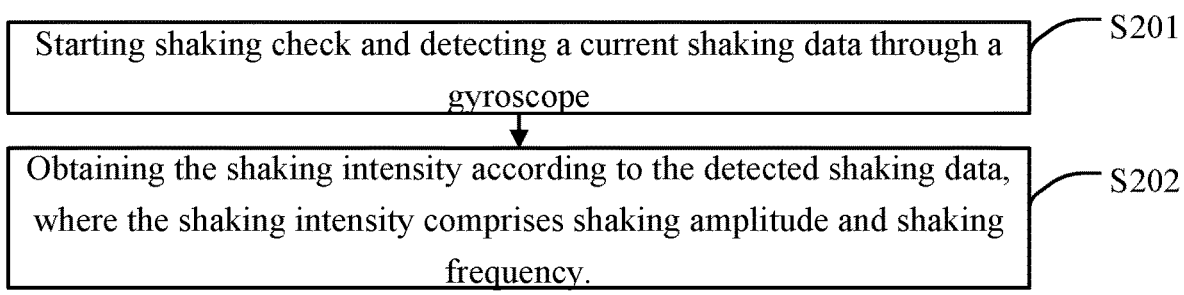

FIG. 4 is a schematic flowchart of step S200 in FIG. 1 according to an embodiment of the present disclosure.

Figure 5:
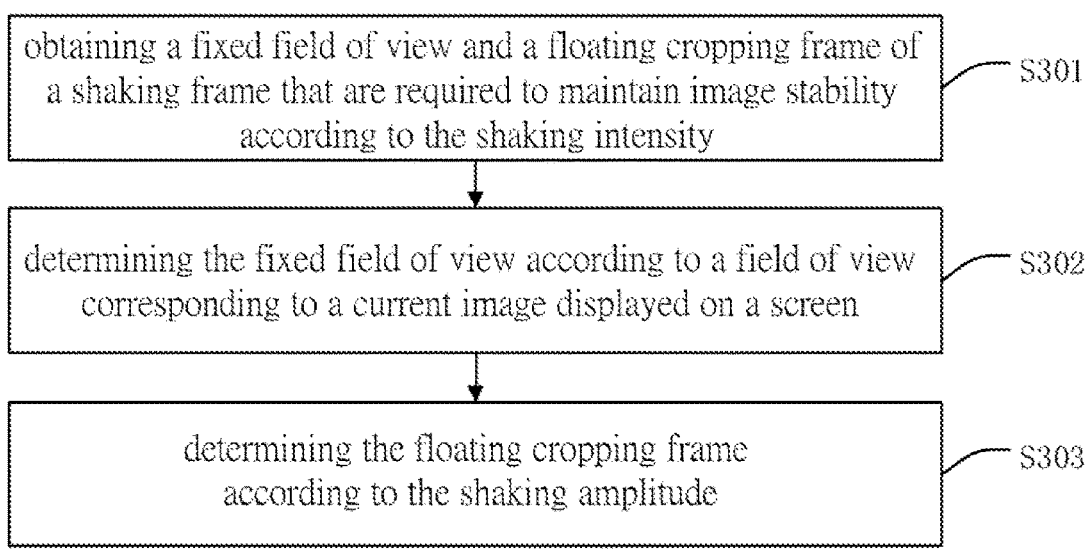

FIG. 5 is a schematic flowchart of step S300 in FIG. 1 according to an embodiment of the present disclosure.

Figure 6:
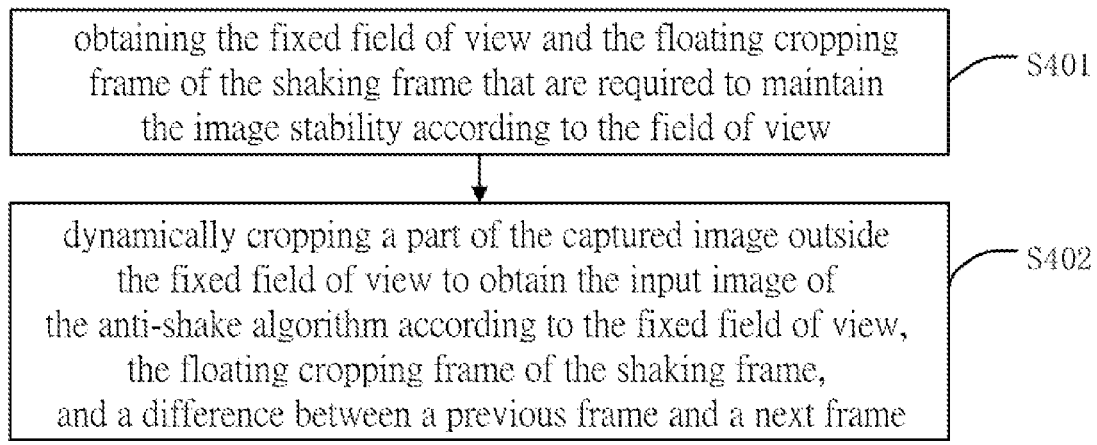

FIG. 6 is a schematic flowchart of step S400 in FIG. 1 according to an embodiment of the present disclosure.

Figure 7:
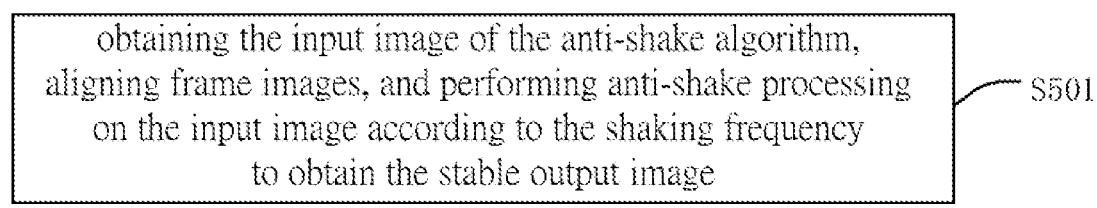

FIG. 7 is a schematic flowchart of step S500 in FIG. 1 according to an embodiment of the present disclosure.

Figure 8:
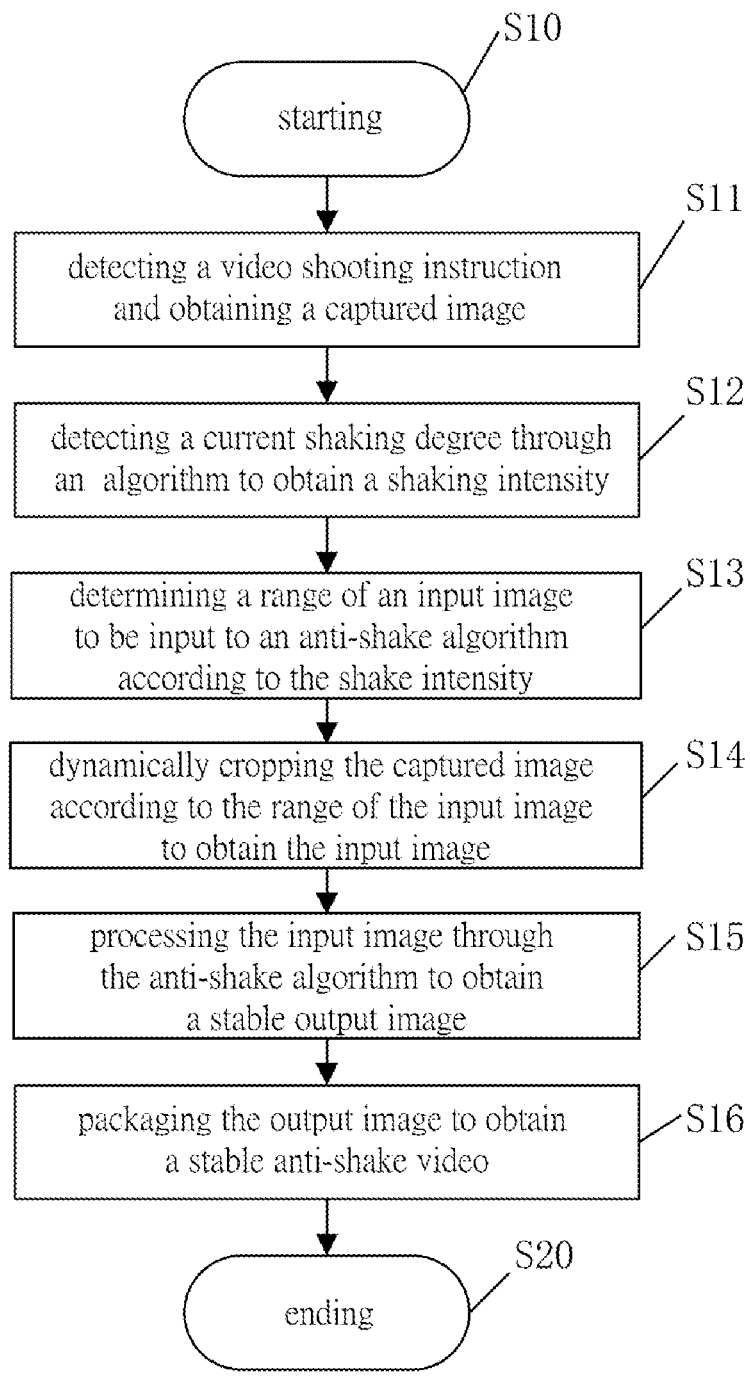

FIG. 8 is a flowchart of the image stabilization method under digital zoom applied to video shooting.

Figure 9:
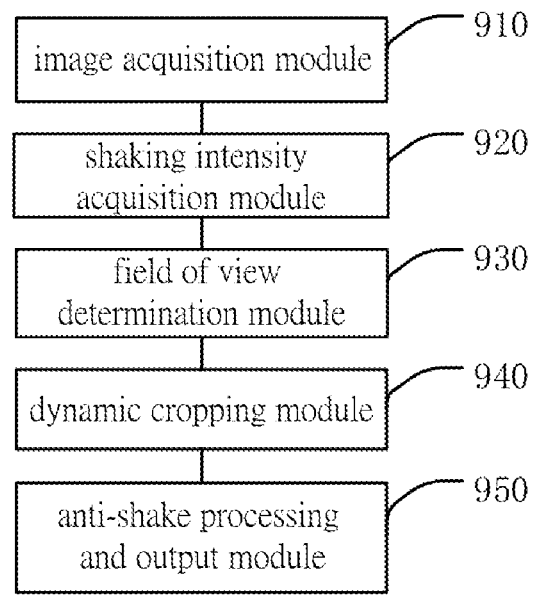

FIG. 9 is a block diagram of an image stabilization device under digital zoom according to an embodiment of the present disclosure.

Figure 10:
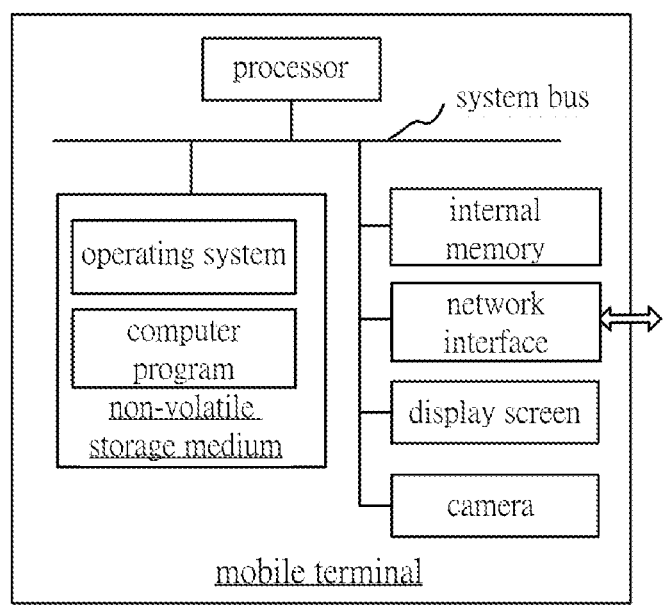

FIG. 10 is a block diagram of a mobile terminal according to an embodiment of the present disclosure.

EMBODIMENTS OF INVENTION

Detailed Description of Embodiments

In order to make the purpose, technical solution and effect of the present disclosure clearer and clearer, the present disclosure will be further described in detail below with reference to the accompanying drawings and examples. It should be understood that the specific embodiments described here are only used to explain the present disclosure and are not intended to limit the present disclosure.

It should be noted that if the embodiments of the present disclosure involve directional indications, such as up, down, left, right, front, back, the directional indications are only used to explain the position of a certain posture (as shown in the drawings) of the relative positional relationship or movement condition between the components. If the specific posture changes, the directional indication will also change accordingly.

In addition, if there are descriptions involving "first", "second", etc. in the embodiments of the present disclosure, the descriptions of "first" and "second" are only for descriptive purposes and shall not be understood as indications or implications. Its relative importance or implicit indication of the number of technical features indicated. Therefore, features defined as "first" and "second" may explicitly or implicitly include at least one of these features. In addition, the technical solutions in various embodiments can be combined with each other, but they must be implemented on the basis that those of ordinary skill in the art can implement them. When the combination of technical solutions appears to be contradictory or cannot be realized, it should be deemed that such combination of technical solutions does not exist and is not within the protection scope required by the present disclosure.

With development of science and technology and improvement of people's living standards, people increasingly like to use mobile phones to take photos or videos to record their lives. It has become a trend to upload self-taken pictures or videos to WeChat Moments or even short video platforms to share life.

In current technology, not all mobile phones are equipped with anti-shake function. In particular, inexpensive mobile phones are not equipped with optical zoom and optical anti-shake cameras due to cost constraints. When people use digital zoom, if a mobile phone camera shakes too much or has inconsistent shaking frequency, an image displayed on a mobile phone screen will often be blurred and have residual images, resulting in unsightly zoom photos and zoom video, making it impossible to provide users with a more complete and high-quality photography experience.

In order to solve the above problem, an embodiment of the present disclosure provides an image stabilization method under digital zoom. The image stabilization method under digital zoom of this embodiment can detect a shaking intensity of an image currently captured by a user's mobile phone in real time, and dynamically correct an input image input to an anti-shake algorithm according to the shaking intensity, so that a resulting corrected output image has enhanced stability and will not be blurred by frequent shaking of a mobile phone camera, thereby improving user experience.

EXEMPLARY METHOD

First Embodiment

As shown in FIG. 1, this embodiment provides an image stabilization method under digital zoom. The method may be used in mobile devices such as mobile phones and tablet computers. The method according to this embodiment comprises the following steps.

Step S100: obtaining a captured image.

In this embodiment, the image stabilization method may be used to stabilize an image at a moment of taking a photo under digital zoom, to stabilize a preview image before taking a photo, and to stabilize a video image when shooting a video. The captured image is obtained by a mobile terminal. The captured image is an original image captured by a CMOS image sensor of a camera of the mobile terminal.

Step S200: detecting a current shaking condition to obtain a shaking intensity.

In this embodiment, the mobile terminal detects the current shaking condition of the captured image in real time through a sensor or a software algorithm, which specifically comprises detecting displacement changes, velocity changes, acceleration changes, and direction changes of the mobile terminal or a camera of the mobile terminal in real time through a gyroscope, and obtaining the shaking intensity of the captured image according to the above parameters, wherein the shaking intensity represents a current shaking degree of the camera of the mobile terminal or the captured image; or directly identifying the captured image through the software algorithm, and calculating displacement changes, velocity changes, acceleration changes, and direction changes of pixels to obtain the shaking intensity of the captured image; or obtaining a more accurate shaking intensity through a method comprising the above two methods. The mobile terminal detects the shaking degree of the camera of mobile terminal or the captured image in real time, which facilitates accurate real-time stabilization of the captured image.

Step S300: determining a field of view required to maintain image stability according to the shaking intensity.

In this embodiment, the mobile terminal obtains the field of view required to maintain image stability through a specific algorithm according to the obtained shaking intensity. As shown in FIG. 2, for example, if the shaking intensity at a current moment is A, and a range of an image displayed on a screen of the mobile terminal after digital zooming in the captured image is a range of a frame a. In order to ensure stability of the image in frame a, before inputting the image into an anti-shake algorithm, a certain amount of image between a floating cropping frame b and the frame a needs to be retained. That is, an image between the frame b and frame a needs to be cut off in the anti-shake algorithm, and the final remaining processed frame a is a digital zoom image that a user wants to take. A field of view corresponding to the frame b is the field of view required to maintain image stability. The anti-shake algorithm is an image processing method that obtains a stable and clear image in a center by losing a certain field of view. The field of view changes in real time according to the shaking intensity, which can ensure that each frame of the image input to the anti-shake algorithm will eventually result in a highly stable photo, video, or preview image.

Step S400: dynamically cropping the captured image according to the field of view to obtain an input image of an anti-shake algorithm.

In this embodiment, the captured image, that is, the original image captured by the CMOS image sensor of the camera of the mobile terminal, is cropped according to the field of view, so that a part of the captured image in the frame b is retained, the other part of the captured image is cut off. Only the part of the captured image in the frame b is used as the input image of the anti-shake algorithm. A method of inputting an image with a single field of view into an anti-shake algorithm easily leads to the following problems. When shaking is small, computational effort is wasted. When the shaking is too large, the floating cropping frame is relatively small, resulting in a blurry image. In contrast, the method of detecting the shaking intensity in real time and inputting the input image that matches the shaking intensity has the following advantages. When the shaking is small, the computational effort is effectively distributed according to the shaking intensity. When the shaking is too large, the floating cropping frame increases accordingly, which ensures definition of a final output image.

Step S500: processing the input image of the anti-shake algorithm through the anti-shake algorithm to obtain a stable output image.

In this embodiment, the mobile terminal processes the input image through the anti-shake algorithm to obtain an output image with high definition and stability.

The present disclosure detects a shaking condition of the camera under digital zoom in real time to adjust the field of view in real time. A part of the captured image in the field of view comprises a fixed field of view and a shaking frame. A size of the shaking frame is adjusted in real time according to the shaking condition, so that the output image under digital zoom is clear and stable, thereby improving user experience in mobile photography.

Specifically, in this embodiment, a mobile phone commonly used by a user is used as the mobile terminal. When the mobile terminal is another device, reference may be made to a specific solution in this embodiment.

In an application scenario, the original captured image captured by the CMOS image sensor of the camera of the mobile phone is obtained in real time.

Specifically, as shown in FIG. 3, step S100 comprises:
step S101: receiving a shooting instruction and starting image shooting;
step S102: obtaining the captured image.

For example, when a user opens a photography APP installed in the mobile phone, the mobile phone receives the shooting instruction, starts image shooting, and obtains the captured image captured by the CMOS image sensor of the camera of the mobile phone, that is, an unprocessed full-frame image.

In an application scenario, a current shaking condition of the mobile phone is detected through a sensor of the mobile phone to obtain a shaking intensity.

Specifically, as shown in FIG. 4, step S200 comprises:
step S201: starting shaking check and detecting a current shaking data through a gyroscope;
step S202: obtaining the shaking intensity according to the detected shaking data, where the shaking intensity comprises shaking amplitude and shaking frequency;
step S203: The shaking intensity includes shaking amplitude information and shaking frequency information.

The shaking data comprises a displacement change, a velocity change, an acceleration change, and a direction change.

For example, after a user opens a camera app on a mobile phone, and adjusts digital zoom to 5× zoom, the mobile phone starts shaking check. The mobile phone detects a current shaking data of the mobile phone through a gyroscope sensor built into the mobile phone. The shaking data comprises a displacement of the mobile phone in a same direction and a frequency of changing a shaking direction of the mobile phone. A shaking intensity comprising shaking amplitude and shaking frequency is obtained according to the shaking data. In addition, data used to characterize the shaking intensity, such as velocity and acceleration, may also be used as a quantitative standard for the shaking intensity, providing more accurate shake measurement data for mobile phones and captured images.

In an application scenario, the mobile phone determines a field of view required to maintain image stability according to the shaking intensity.

Specifically, as shown in FIG. 5, step S300 comprises:
step S301: obtaining a fixed field of view and a floating cropping frame of a shaking frame that are required to maintain image stability according to the shaking intensity;
step S302: determining the fixed field of view according to a field of view corresponding to a current image displayed on a screen;
step S303: determining the floating cropping frame according to the shaking amplitude.

Before the step of obtaining the captured image, the method further comprises:
presetting the field of view required to maintain image stability for each shaking intensity.

For example, a comparison table is preset. The comparison table contains a relationship between the shaking intensity and the field of view, specifically a relationship between the shaking amplitude of the shaking intensity and the field of view. A shaking intensity C corresponds to a field of view C, a shaking intensity D corresponds to a field of view D, etc. The shaking intensity C and the shaking intensity D have numerical ranges. When a shaking intensity at a certain time falls into the numerical range of the shaking intensity D, it corresponds to the field of view D.

The mobile phone of the user detects a current shaking data B, and then obtains a current shaking intensity B of a captured image according to the shaking data B. The mobile phone calls the comparison table and obtains a field of view B required to maintain image stability for the shaking intensity B by querying the comparison table. The field of view B comprises a fixed field of view B1 required by the user for stable display under 5× zoom and a floating cropping frame B2 that is cropped after being processed by an anti-shake algorithm. The fixed field of view B1 is a field of view corresponding to a current image displayed on a screen of the mobile phone of the user under 5× zoom. The floating cropping frame B2 is determined by the shaking amplitude of the shaking intensity B. When a shaking amplitude of the mobile phone is larger, the floating cropping frame B2 that will be cropped after being processed by the anti-shake algorithm should be larger. When the shaking amplitude of the mobile phone is smaller, that is, the shaking amplitude is smaller, the floating cropping frame B2 that will be cropped after being processed by the anti-shake algorithm should be smaller.

Therefore, regardless of how the shaking intensity changes, the fixed field of view is determined by a digital zoom factor controlled by the user. When the shaking amplitude of the shaking intensity becomes larger, a range of the floating cropping frame becomes larger. When the shaking intensity becomes smaller, the range of the floating cropping frame becomes smaller.

Furthermore, step S301 comprises:
  obtaining a zoom factor of the image displayed on the screen;
  obtaining the fixed field of view according to the zoom factor and the shaking intensity.

At different zoom factors, one shaking degree causes different degrees of image blur. Therefore, the zoom factor may be added to the comparison table, and the fixed field of view is determined according to the zoom factor and the shaking intensity. A more accurate fixed field of view is obtained through this method.

In an application scenario, the original captured image is dynamically cropped according to the field of view determined by the mobile phone to obtain an input image that will be processed by an anti-shake algorithm.

As shown in FIG. 6, step S400 comprises:
  step S401: obtaining the fixed field of view and the floating cropping frame of the shaking frame that are required to maintain the image stability according to the field of view;
  step S402: dynamically cropping a part of the captured image outside the fixed field of view to obtain the input image of the anti-shake algorithm according to the fixed field of view, the floating cropping frame of the shaking frame, and a difference between a previous frame and a next frame.

For example, the mobile phone dynamically crops an original captured image according to a field of view B. The field of view B comprises a fixed field of view B1 that the user wants to shoot and a floating cropping frame B2. The fixed field of view B1 is a field of view corresponding to an image displayed on a screen of the mobile phone under 5× zoom. The floating cropping frame B2 is a part that is cropped after being processed by the anti-shake algorithm. The floating cropping frame B2 becomes larger as the shaking amplitude of the shaking intensity B becomes larger, and becomes smaller as the shaking amplitude of the shaking intensity B becomes smaller. When the mobile phone dynamically crops the part of the captured image outside the fixed field of view, if the mobile phone does not shake at all, an area of the floating cropping frame B2 is 0, and the mobile phone dynamically crops a part of the captured image outside the fixed field of view B1. If the mobile phone detects that the shaking amplitude of the mobile phone becomes larger, the area of the floating cropping frame B2 gradually increases, and the mobile phone dynamically crops a part of the captured image outside an area of the fixed field of view B1 plus the floating cropping frame B2 to obtain an input image of the anti-shake algorithm.

At the same time, a current frame image may be preprocessed to a certain extent based on a difference between a previous frame and a next frame, that is, a difference between the current frame image and a previous frame image. For example, there is a house in a middle of the previous frame image under 5× zoom, but the house in the current frame image is shifted. At this time, the mobile phone shifts the field of view to obtain a field of view when the house is in a middle of the current frame image as the fixed field of view. The mobile phone does not regard a field of view when an image is shifted due to shaking as a fixed field of view. This method can further improve stability of the captured image and anti-shake performance.

In an application scenario, the mobile phone performs anti-shake processing on the input image through the anti-shake algorithm to obtain a clear and stable output image.

As shown in FIG. 7, step S500 comprises:
  step S501: obtaining the input image of the anti-shake algorithm, aligning frame images, and performing anti-shake processing on the input image according to the shaking frequency to obtain the stable output image.

For example, the mobile phone obtains the dynamically cropped input image for anti-shake processing, aligns and coincides frame images, and obtains a high-definition and high-stability output image through the anti-shake algorithm according to the shaking frequency in the shaking intensity B. When the shaking frequency in the shaking intensity B is larger, the anti-shake algorithm consumes more computing power when processing the input image. When the shaking frequency is smaller, the anti-shake algorithm consumes less computing power when processing the input image. By dynamically controlling a size of the input image and controlling computing power consumption of the anti-shake algorithm, consumption of anti-shake processing on the mobile terminal when zooming is greatly reduced, thereby saving power and improving user experience.

The present disclosure is further described in detail by a specific application embodiment below.

In this specific application embodiment, taking the mobile terminal as a mobile phone as an example. As shown in FIG. 8, an image stabilization method under digital zoom in this specific application embodiment comprises the following steps.

Step S10: starting. Then, enter step S10.
Step S11: detecting a video shooting instruction and obtaining a current image captured by a camera sensor. Then, enter step S12.
Step S12: detecting a shaking degree of the captured image through a software algorithm to obtain a current shaking intensity of the captured image. Then, enter the step S13.

Step S13: determining a range of an input image to be input to an anti-shake algorithm according to the shaking intensity. Then, enter step S14.

Step S14: dynamically cropping the captured image according to the range of the input image to obtain the input image to be input to the anti-shake algorithm. Then, enter step S15.

Step S15: processing the input image through the anti-shake algorithm to obtain a stable output image. Then, enter step S16.

Step S16: packaging the output image to obtain a stable video. Then, enter step S20.

Step S20: ending.

It can be seen from the above that in this specific application embodiment of the present disclosure, when a user records a digital zoom video with a mobile phone, if the user's mobile phone detects that the user has given a video recording or shooting instruction, the mobile phone obtains a current original captured image captured by a camera sensor of the mobile phone. Furthermore, the mobile phone compares the captured image with a previous frame image for similar pixels and similar parts and calculates a shaking frequency and a shaking amplitude of the captured image to obtain a shaking intensity through a software algorithm, Furthermore, a range of an input image to be input to an anti-shake algorithm is determined according to the shaking intensity, and comprises an area corresponding to a fixed field of view that the user wants to record, and a floating cropping frame that will be cropped after being processed by the anti-shake algorithm. Furthermore, the captured image is dynamically cropped according to the range of the input image, so as to cut off a region outside the floating cropping frame, leaving only the input image to be input to the anti-shake algorithm. Furthermore, the input image is sent to the anti-shake algorithm, and anti-shake processing is performed to obtain a stable output image of a single frame in real time. When the user ends the recording, the mobile phone packages all the output images into a video format file to obtain a stable and clear anti-shake video. The image stabilization method under digital zoom may be applied to various occasions, such as photography, video recording, and image preview to obtain a stable output image that is anti-shake processed in real time according to the shaking amplitude, thereby improving the user's shooting experience.

Exemplary Device

As shown in FIG. 9, an embodiment of the present disclosure provides an image stabilization device under digital zoom, which comprises: an image acquisition module 910, a shaking intensity acquisition module 920, a field of view determination module 930, a dynamic cropping module 940, anti-shake processing and output module 950. The image acquisition module 910 is configured to obtain a captured image. The shaking intensity acquisition module 920 is configured to detect a current shaking condition to obtain a shaking intensity. The field of view determination module 930 is configured to determine a field of view required to maintain image stability according to the shaking intensity. The dynamic cropping module 940 is configured to dynamically crop the captured image according to the field of view to obtain an input image of an anti-shake algorithm. The anti-shake processing and output module 950 is configured to process the input image of the anti-shake algorithm through the anti-shake algorithm to obtain a stable output image.

Based on the above embodiments, the present disclosure further provides a mobile terminal, and its block diagram is shown in FIG. 10. The mobile terminal comprises a processor, a memory, a network interface, and a display screen that are connected via a system bus. The processor of the mobile terminal is configured to provide computing and control functions. The memory of the mobile terminal comprises a non-volatile storage medium and an internal memory. The non-volatile storage medium stores an operating system and a computer program. The internal memory provides an environment for operation of the operating system and the computer program stored in the non-volatile storage medium. The network interface of the mobile terminal is configured to communicate with an external terminal through network connection. The computer program is executed by the processor to implement the image stabilization method under digital zoom. The display screen of the mobile terminal may be a liquid crystal display screen or an e-ink display screen.

In some embodiments of the present disclosure, the image stabilization device includes a preset module configured to preset the field of view required to maintain the image stability for each shaking intensity.

In some embodiments of the present disclosure, the image acquisition module 910 is further configured to receive a shooting instruction, start image shooting, and obtain the captured image.

In some embodiments of the present disclosure, the shaking intensity acquisition module 920 is configured to start shaking check and detecting a current shaking data through a gyroscope, and obtain the shaking intensity according to the detected shaking data, wherein the shaking intensity comprises shaking amplitude and shaking frequency.

In some embodiments of the present disclosure, the shaking data comprises a displacement change, a velocity change, an acceleration change, and a direction change.

In some embodiments of the present disclosure, the field of view determination module 930 is configured to obtain a fixed field of view and a floating cropping frame of a shaking frame that are required to maintain the image stability according to the shaking intensity, determine the fixed field of view according to a field of view corresponding to a current image displayed on a screen, and determine the floating cropping frame according to the shaking amplitude.

In some embodiments of the present disclosure, the field of view determination module 930 is configured to obtain a zoom factor of the image displayed on the screen, and obtain the fixed field of view according to the zoom factor and the shaking intensity.

In some embodiments of the present disclosure, the field of view determination module 930 is configured to obtain the fixed field of view and the floating cropping frame of the shaking frame that are required to maintain the image stability according to the field of view, and to dynamically crop a part of the captured image outside the fixed field of view to obtain the input image of the anti-shake algorithm according to the fixed field of view, the floating cropping frame of the shaking frame, and a difference between a previous frame and a next frame.

In some embodiments of the present disclosure, the anti-shake processing and output module 950 is configured to obtain the input image of the anti-shake algorithm, aligning frame images, and perform anti-shake processing on the input image according to the shaking frequency to obtain the stable output image.

A person skilled in the art is aware that the block diagram of FIG. 10 is only a block diagram of a part of a structure of a mobile terminal related to the present disclosure, and does not constitute a limitation on the mobile terminal of the present disclosure. Compared with the mobile terminal shown in FIG. 10, a specific mobile terminal may comprise more or fewer components, or combine some components, or have a different arrangement of components.

The present disclosure further provides a mobile terminal. The mobile terminal comprises a memory, a processor, and an image stabilization program under digital zoom stored in the memory and executed by the processor to perform opertions comprising:

obtaining a captured image;
detecting a current shaking condition to obtain a shaking intensity;
determining a field of view required to maintain image stability according to the shaking intensity;
dynamically cropping the captured image according to the field of view to obtain an input image of an anti-shake algorithm;
processing the input image of the anti-shake algorithm through the anti-shake algorithm to obtain a stable output image.

Optionally, before the obtaining the captured image, the operations further comprise:

presetting the field of view required to maintain the image stability for each shaking intensity.

Optionally, the obtaining the captured image comprises:
receiving a shooting instruction and starting image shooting;
obtaining the captured image.

Optionally, the detecting the current shaking condition to obtain the shaking intensity comprises:

starting shaking check and detecting a current shaking data through a gyroscope;
obtaining the shaking intensity according to the detected shaking data, where the shaking intensity comprises shaking amplitude and shaking frequency.

Optionally, the shaking data comprises a displacement change, a velocity change, an acceleration change, and a direction change.

Optionally, the determining the field of view required to maintain the image stability according to the shaking intensity comprises:

obtaining a fixed field of view and a floating cropping frame of a shaking frame that are required to maintain the image stability according to the shaking intensity;
determining the fixed field of view according to a field of view corresponding to a current image displayed on a screen;
determining the floating cropping frame according to the shaking amplitude.

Optionally, the dynamically cropping the captured image according to the field of view to obtain the input image of the anti-shake algorithm comprises:

obtaining the fixed field of view and the floating cropping frame of the shaking frame that are required to maintain the image stability according to the field of view;
dynamically cropping a part of the captured image outside the fixed field of view to obtain the input image of the anti-shake algorithm according to the fixed field of view, the floating cropping frame of the shaking frame, and a difference between a previous frame and a next frame.

Optionally, the processing the input image of the anti-shake algorithm through the anti-shake algorithm to obtain the stable output image comprises:

obtaining the input image of the anti-shake algorithm, aligning frame images, and performing anti-shake processing on the input image according to the shaking frequency to obtain the stable output image.

Those of ordinary skill in the art can understand that all or part of the steps processes in the methods of the above embodiments can be implemented by computer readable program instructions executed by hardware. The computer readable program instructions can be stored in a non-volatile computer-readable storage medium. When executed, the computer program instructions can include the processes of the embodiments of the above methods. Any reference to memory, storage, database or other media used in the various embodiments provided by the present invention may include non-volatile and/or volatile memory. Non-volatile memory may include read-only memory (ROM), programmable ROM (PROM), electrically programmable ROM (EPROM), electrically erasable programmable ROM (EEPROM), or flash memory. Volatile memory may include random access memory (RAM) or external cache memory. RAM is available in many forms such as static RAM (SRAM), dynamic RAM (DRAM), synchronous DRAM (SDRAM), double data rate SDRAM (DDRSDRAM), enhanced SDRAM (ESDRAM), synchronous link (Synchlink) DRAM (SLDRAM), memory bus (Rambus) direct RAM (RDRAM), direct memory bus dynamic RAM (DRDRAM), and memory bus dynamic RAM (RDRAM), etc.

In the above, the invention provides image stabilization method, device, mobile terminal, and medium under digital zoom, which solve a problem in existing technology that an image taken by a mobile terminal under digital zoom is unstable. The method includes: obtaining a captured image; detecting a current shaking condition to obtain a shaking intensity; determining a field of view required to maintain image stability according to the shaking intensity; dynamically cropping the captured image according to the field of view to obtain an input image of an anti-shake algorithm; processing the input image of the anti-shake algorithm through the anti-shake algorithm to obtain a stable output image. In the present disclosure, when the mobile terminal uses zoom, an input image to be input to an anti-shake algorithm is dynamically cropped according to a shaking intensity in real time, so as to obtain a more stable and clear output image, thereby improving user experience.

Finally, it should be noted that the above embodiments are only used to illustrate technical solutions of the present disclosure, but not to limit them. Although the present disclosure is described in detail with reference to the above embodiments, it should be understood by those skilled in the art that they can modify the technical solutions recited in the foregoing embodiments, or replace some of technical features in the foregoing embodiments with equivalents. These modifications or replacements do not cause essence of corresponding technical solutions to depart from the scope of the technical solutions of the embodiments of the present disclosure.

What is claimed is:

1. An image stabilization method under digital zoom, comprising:

obtaining a captured image;
starting shaking check and detecting a shaking data through a gyroscope, wherein the shaking data comprises a displacement change, a velocity change, an acceleration change, and a direction change;
obtaining a shaking intensity according to the detected shaking data, wherein the shaking intensity comprises shaking amplitude and shaking frequency;
determining a field of view required to maintain image stability according to the shaking intensity;

dynamically cropping the captured image according to the field of view to obtain an input image of an anti-shake algorithm;

processing the input image of the anti-shake algorithm through the anti-shake algorithm to obtain a stable output image.

2. The method according to claim 1, before the obtaining the captured image, further comprising:

presetting the field of view required to maintain the image stability for each shaking intensity.

3. The method according to claim 1, wherein the obtaining the captured image comprises:

receiving a shooting instruction and starting image shooting;

obtaining the captured image.

4. The method according to claim 1, wherein the determining the field of view required to maintain the image stability according to the shaking intensity comprises:

obtaining a fixed field of view and a floating cropping frame of a shaking frame that are required to maintain the image stability according to the shaking intensity;

determining the fixed field of view according to a field of view corresponding to a current image displayed on a screen;

determining the floating cropping frame according to the shaking amplitude.

5. The method according to claim 4, wherein the obtaining the fixed field of view required to maintain the image stability according to the shaking intensity comprises:

obtaining a zoom factor of the image displayed on the screen;

obtaining the fixed field of view according to the zoom factor and the shaking intensity.

6. The method according to claim 4, wherein the dynamically cropping the captured image according to the field of view to obtain the input image of the anti-shake algorithm comprises:

obtaining the fixed field of view and the floating cropping frame of the shaking frame that are required to maintain the image stability according to the field of view;

dynamically cropping a part of the captured image outside the fixed field of view to obtain the input image of the anti-shake algorithm according to the fixed field of view, the floating cropping frame of the shaking frame, and a difference between a previous frame and a next frame.

7. The method according to claim 1, wherein the processing the input image of the anti-shake algorithm through the anti-shake algorithm to obtain the stable output image comprises:

obtaining the input image of the anti-shake algorithm, aligning frame images, and performing anti-shake processing on the input image according to the shaking frequency to obtain the stable output image.

8. A mobile terminal, comprising a memory, a processor, and image stabilization program instructions under digital zoom stored in the memory and executed by the processor to perform operations comprising:

obtaining a captured image;

starting shaking check and detecting a shaking data through a gyroscope, wherein the shaking data comprises a displacement change, a velocity change, an acceleration change, and a direction change;

obtaining a shaking intensity according to the detected shaking data, wherein the shaking intensity comprises shaking amplitude and shaking frequency;

determining a field of view required to maintain image stability according to the shaking intensity;

dynamically cropping the captured image according to the field of view to obtain an input image of an anti-shake algorithm;

processing the input image of the anti-shake algorithm through the anti-shake algorithm to obtain a stable output image.

9. The mobile terminal according to claim 8, wherein before the obtaining the captured image, the operations further comprise:

presetting the field of view required to maintain the image stability for each shaking intensity.

10. The mobile terminal according to claim 8, wherein the obtaining the captured image comprises:

receiving a shooting instruction and starting image shooting;

obtaining the captured image.

11. The mobile terminal according to claim 8, wherein the determining the field of view required to maintain the image stability according to the shaking intensity comprises:

obtaining a fixed field of view and a floating cropping frame of a shaking frame that are required to maintain the image stability according to the shaking intensity;

determining the fixed field of view according to a field of view corresponding to a current image displayed on a screen;

determining the floating cropping frame according to the shaking amplitude.

12. The mobile terminal according to claim 11, wherein the obtaining the fixed field of view required to maintain the image stability according to the shaking intensity comprises:

obtaining a zoom factor of the image displayed on the screen;

obtaining the fixed field of view according to the zoom factor and the shaking intensity.

13. The mobile terminal according to claim 11, wherein the dynamically cropping the captured image according to the field of view to obtain the input image of the anti-shake algorithm comprises:

obtaining the fixed field of view and the floating cropping frame of the shaking frame that are required to maintain the image stability according to the field of view;

dynamically cropping a part of the captured image outside the fixed field of view to obtain the input image of the anti-shake algorithm according to the fixed field of view, the floating cropping frame of the shaking frame, and a difference between a previous frame and a next frame.

14. The mobile terminal according to claim 8, wherein the processing the input image of the anti-shake algorithm through the anti-shake algorithm to obtain the stable output image comprises:

obtaining the input image of the anti-shake algorithm, aligning frame images, and performing anti-shake processing on the input image according to the shaking frequency to obtain the stable output image.

15. A non-transitory computer readable storage medium, storing image stabilization program instructions executable by a processor to perform operations comprising:

obtaining a captured image;

starting shaking check and detecting a shaking data through a gyroscope, wherein the shaking data comprises a displacement change, a velocity change, an acceleration change, and a direction change;

obtaining a shaking intensity according to the detected shaking data, wherein the shaking intensity comprises shaking amplitude and shaking frequency;

determining a field of view required to maintain image stability according to the shaking intensity;

dynamically cropping the captured image according to the field of view to obtain an input image of an anti-shake algorithm;

processing the input image of the anti-shake algorithm through the anti-shake algorithm to obtain a stable output image.

* * * * *